3,703,501
VINYLNORBORNENE/MALEIC ANHYDRIDE COPOLYMERS AND PROCESS OF PREPARING SAME

Roger L. McCartney, Louisville, Ky., assignor to Celanese Coatings Company, New York, N.Y.
No Drawing. Filed Aug. 12, 1971, Ser. No. 171,317
Int. Cl. C08f 19/00
U.S. Cl. 260—78.5 R                                21 Claims

ABSTRACT OF THE DISCLOSURE

Unsaturated polyanhydrides, useful as curing agents for epoxy resins, are prepared by the free radical addition polymerization of vinylnorbornene and maleic anhydride, and up to about 50 weight percent of other monomers if desired.

BACKGROUND OF THE INVENTION

This invention relates to curing agents for epoxy resins. More particularly, this invention relates to unsaturated polyanhydride curing agents for epoxy resins, which curing agents are based upon copolymers of vinylnorbornene and maleic anhydride.

The use of anhydrides as curing agents for epoxy resins is well known in the art. The prior art anhydrides include linear, polymeric aliphatic anhydrides, simple alicyclic anhydrides and modifications thereof, multi-ring alicyclic anhydrides, aromatic anhydrides, and various halogenated anhydrides. For a detailed discussion of the use of anhydrides as curing agents for epoxy resins, see H. Lee and K. Neville, "Handbook of Epoxy Resins," McGraw-Hill Book Company, New York, 1967, pages 12–1 to 12–40, which material is incorporated herein by reference.

The prior art anhydrides have found considerable use since anhydride/epoxy resin systems generally exhibit low exotherms upon curing are free from skin sensitization, and have good chemical and electrical properties. However, such systems are not without disadvantages. For example, many anhydrides are high-melting solids (i.e., solids melting above about 100 degrees centigrade) and require the application of heat in order to dissolve the anhydride in the epoxy resin. This application of heat accelerates the curing reaction, thereby limiting the useful life of the mixture. Many anhydrides are volatile at elevated temperatures, and loss of the anhydride by volatilization (or sublimation) during mixing and/or curing results in products having variable compositions and properties. In addition, some anhydrides, such as citraconic anhydride and itaconic anhydride, liberate carbon dioxide upon curing in the presence of a tertiary amine. Others, such as maleic anhydride, liberate irritating fumes at the temperatures normally required for incorporation into the epoxy resin. Finally, the use of anhydrides as curing agents often results in cured products which are extremely hard and brittle. While not strictly a disadvantage, most anhydrides require the use of an accelerator in order to avoid either high cure temperatures or abnormally long cure times.

Of course, the disadvantages in the use of anhydride curing agents have long been recognized. Many attempts have been made to overcome the disadvantage, with some success. For example, the problem of volatility of maleic anhydride has been overcome by copolymerizing maleic anhydride with vinyl ether or styrene. The resultant polyanhydrides usually are solids, however, and still require heating in order to form a homogeneous anhydride/epoxy resin system. Maleic anhydride also has been adducted with methylcyclopentadiene, butadiene, and tall oil fatty acids, to give just a few examples. Such adducts not only are less volatile than maleic anhydride, but also tend to give more flexible cured resins. Also, some of the adducts are liquid. However, all of the prior art anhydrides tend to give cured resins whose properties can be varied only within narrow limits without the separate incorporating of flexibilizers or diluents. This is true even of those unsaturated anhydrides which permit additional cross-linking through the unsaturation.

SUMMARY OF THE INVENTION

It is therefore an object of the present invention to provide novel unsaturated polyanhydride curing agents for epoxy resins.

It is a further object of the present invention to provide a process for preparing unsaturated polyanhydrides which are non-volatile liquids or low-melting solids.

Still another object is to provide unsaturated polyanhydrides which are capable of cross-linking through the unsaturation at temperatures above those employed to cure the epoxy resin by reactions involving the anhydride groups.

Yet another object is to provide unsaturated polyanhydrides which will give cured epoxy resins having stability at temperatures of about 350 degrees Fahrenheit or higher.

A further object of the present invention is to provide unsaturated anhydrides which will permit the preparation of cured resins whose properties can be varied over a relatively wide range without the incorporation of flexibilizers, diluents, and the like.

These and other objects will be apparent to those skilled in the art from a consideration of the specification and claims which follow.

In accordance with the present invention, unsaturated polyanhydrides are obtained by the mercaptan-initiated, free radical addition polymerization of 5-vinyl-2-norbornene (referred to herein as vinylnorbornene) with maleic anhydride. Up to about 50 weight percent of other monomers polymerizable therewith can be added, if desired.

In carrying out the process of the present invention, the monomers and mercaptan initiator are mixed together and heated in the presence of oxygen at a temperature of from about 50 to about 130 degrees centigrade, for a time sufficient to obtain substantially complete conversion of the monomers to polymer; i.e., at least about 80 percent conversion. A solvent can be employed if desired. In carrying out the process of the present invention, low to medium molecular weight polyanhydrides can be produced simply by varying the amount of initiator employed.

DETAILED DESCRIPTION OF THE INVENTION

The unsaturated polyanhydrides obtained by the mercaptan-initiated polymerization of vinylnorbornene and maleic anhydride can be represented by the following general formula when the two monomers are employed in equimolar quantities:

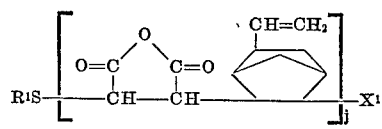

wherein $R^1$ is an organic radical, $X^1$ is either hydrogen or $R^1S$—, and $j$ is an integer greater than 1 and less than about 10.

The polymerization reaction appears to involve the norbornenyl unsaturation almost exclusively, leaving the vinyl double bond essentially intact. On the other hand, the usual free radical polymerization catalysts, such as peroxides, would involve both double bonds in vinylnorbornene, resulting in solid, crosslinked materials having no residual unsaturation.

The vinylnorbornene and maleic anhydride need not be employed in equimolar quantities, even though it is most preferred to do so. The molar ratio of vinylnorbornene to maleic anhydride can be varied over a wide range; the preferred vinylnorbornene: maleic anhydride ratios vary from about 2:1 to about 1:2. Of course, higher amounts of either monomer can be employed. However, as the amount of either monomer is increased, the properties of the resultant copolymer will approach those of the homopolymer of the predominant monomer. When the vinylnorbornene: maleic anhydride ratio is other than 1:1, the resultant copolymers can be represented by the following general formula:

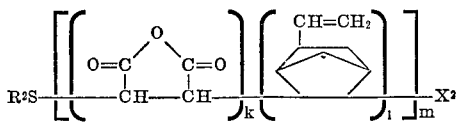

wherein $R^2$ is an organic radical; $X^2$ is either hydrogen or $R^2S-$; $k$ and $l$ independently are integers equal to or greater than 1; and $m$ is an integer greater than 1 and less than about 10.

The incorporation of other monomers polymerizable with vinylnorbornene and maleic anhydride is believed not to affect the preference of vinylnorbornene to react, under mercaptan initiation, through the norbornenyl double bond. Consequently, the maleic anhydride and vinylnorbornene will react in the same manner as when such other monomers are not employed. However, the repeat unit obtained upon the incorporation of one or more other monomers will depend upon the reactivities of such monomers relative to the reactivities of vinylnorbornene and maleic anhydride. Thus, incorporation of one or more monomers having reactivities approximately equal to those of vinylnorbornene and maleic anhydride will give essentially random or homogeneous copolymers. If the reactivities of such monomers are significantly different, however, the resultant copolymers or interpolymers will approximate block or graft copolymers. In both cases, the resultant unsaturated polyanhydrides can be represented by the following general formula:

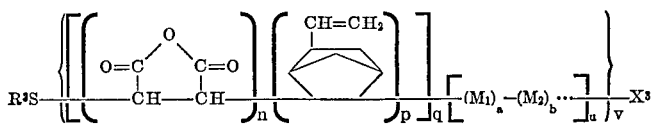

wherein $R^3$ is an organic radical; $X^3$ is either hydrogen or $R^3S-$; $M_1, M_2, \ldots$ are monomers other than vinylnorbornene and maleic anhydride; $a, b, \ldots$ and $u$ independently are integers, including zero; $n, p,$ and $q$ independently are integers equal to or greater than 1; and $v$ is an integer greater than 1 and less than about 10. Thus, if all of the monomers have similar reactivities, $n, p, q, u, a, b, \ldots$ all will be 1. On the other hand, if the reactivities of vinylnorbornene and maleic anhydride differ significantly from those of the other monomers, $q$ and $u$ will be greater than 1, while $a, b, \ldots$ each will be 1 if the other monomers have similar reactivities, or greater than 1 if such monomers have significantly different reactivities.

Of course, the foregoing general formulas are idealized representations only. Such formulas are employed solely to aid in understanding the present invention. Their use is not to be construed as limiting the unsaturated polyanhydrides strictly to the configurations shown. Sequences of monomers other than those illustrated are meant to be included within the scope of the present invention. Thus the general formulas serve only to identify the monomeric units comprising the unsaturated polyanhydrides of the present invention.

It will be readily apparent to those skilled in the art that the properties of the unsaturated polyanhydrides of the present invention can be varied over a wide range by the proper selection of monomers other than vinylnorbornene and maleic anhydride. Consequently, the properties of the cured epoxy resins can be varied widely. For example, the hardness or brittleness of the cured epoxy resins can be reduced by incorporating into the unsaturated polyanhydride varying amounts of one or more "soft" monomers, such as 2-ethylhexyl acrylate, lauryl acrylate, and stearyl acrylate. Such incorporation can be accomplished without affecting the vinyl unsaturation of the polyanhydride.

In general, suitable monomers other than vinylnorbornene and maleic anhydride include vinyl aromatic compounds, such as styrene, vinyltoluene, vinylnaphthalene, and the like; vinyl cyanides, such as acrylonitrile and methacrylonitrile; alkyl esters of acrylic, methacrylic, and crotonic acids wherein the alkyl group contains from one to about 18 carbon atoms, examples of which esters are methyl acrylate, methyl methacrylate, ethyl acrylate, ethyl methacrylate, ethyl crotonate, 2-ethylhexyl acrylate, lauryl acrylate, and stearyl acrylate; and amides of acrylic, methacrylic, and crotonic acids, such as acrylamide, methacrylamide, crotonamide, N-methoxymethylacrylamide, N-methoxymethylmethacrylamide, N-butoxymethylacrylamide, and N-(2-dimethylaminoethyl)acrylamide. As indicated hereinbefore, such monomers can constitute up to about 50 weight percent of the unsaturated polyanhydrides of the present invention, exclusive of initiator.

The mercaptan initiators suitable for use in the present invention can be represented by the general formula, $$R^3SH$$

wherein $R^3$ is an organic radical having from 1 to about 15 carbon atoms, which can be aliphatic, alicyclic, aromatic, or saturated heterocyclic, and substituted or unsubstituted, provided that hydroxyl groups and nitrogen are not present. Furthermore, more than one mercapto group can be present. Preferably, $R^3$ is either aliphatic or alicyclic, has from 2 to about 12 carbon atoms, and is either unsubstituted or substituted only with alkyl, cycloalkyl, alkoxy, cycloalkoxy, carboxy, alkoxycarbonyl, cycloalkoxycarbonyl, and/or mercapto groups. Examples of suitable mercaptan initiators include, among others, methyl mercaptan, ethyl mercaptan, n-butyl mercaptan, isobutyl mercaptan, 2-ethylhexyl mercaptan, decyl mercaptan, dodecyl mercaptan, 2-ethoxyethyl mercaptan, mercaptoacetic acid, methyl mercaptoacetate, 2-mercaptopropionic acid, 3-mercaptopropionic acid, mercaptosuccinic acid, 1,2-ethanedithiol, 1,3-butanedithiol, 1,4-butanedithiol, trimethylolethane tris(3-mercaptopropionate), pentaerythritol tetra(3-mercaptopropionate), trimethylolpropane tris(thioglycolate), pentaerythritol tetra(thioglycolate), cyclohexyl mercaptan, phenyl mercaptan, 1-naphthalenethiol, 2-naphthalenethiol, o-toluenethiol, 2,4-xylenethiol, o-mercaptobenzoic acid, p-tert-butylbenzenethiol, benzyl mercaptan, 2-mercaptoethyl ether, 2-mercaptotetrahydrofuran, and the like.

The amount of mercaptan initiator employed will vary depending upon the monomers being polymerized, the temperature at which the polymerization is being conducted, the desired conversion rate, the type of mercaptan being used, and the properties desired in the final unsaturated polyanhydride. The properties desired in the final polyanhydride are especially important, since the initiator becomes a part of the polymer. Consequently, the molecular weight of the polyanhydride is dependent upon the amount of initiator employed. That is, increasing the amount of initiator decreases the molecular weight of the resultant polyanhydride. Generally, the amount of initiator employed will vary from about 0.01 to about 0.3 equivalent of mercaptan per mole of polymerizable monomers. The preferred range is from about 0.05 to about 0.25 equivalent of mercaptan per mole of polymerizable monomers. The term "equivalent," as used herein, is the mercaptan equivalent weight, determined by dividing the molecular weight of the mercaptan by the number of mercapto groups present in the mercaptan molecule. Useful amounts of initiator, expressed on a weight basis for convenience, often will vary from about 1 part to about 30 parts of mercaptan initiator per 100 parts of monomers. Monomercaptans and polymercaptans are equally satisfactory initiators. Replacing one initiator with another initiator, on an equimolar basis, generally will not appreciably alter the molecular weight of the resultant polyanhydride. Also, the use of mixtures of more than one initiator is considered to be within the scope of the present invention.

The use of solvents is optional. However, the use of solvents during at least part of the reaction aids in controlling viscosity. In general, suitable solvents are those known to those skilled in the art as being useful in free radical addition polymerization reactions and include aromatic, alicyclic, and aliphatic hydrocarbons, ketones, esters, ethers, alcohols and the like. A preferred solvent is methyl isobutyl ketone.

The mercaptan-initiated free radical addition polymerization of vinylnorbornene with maleic anhydride, and other monomers if desired, is not inhibited by the presence of oxygen or air. In fact, oxygen or air acts as an accelerator for the polymerization. Although the presence of dissolved air or oxygen in the monomers is sufficient to initiate and accelerate the polmerization reaction, it is preferred to at least blanket the reactants with oxygen or air. More preferably, air is bubbled through the reactants during at least the initial portion of the reaction. The rate of flow of the air can vary within limits, provided there is a sufficient flow to maintain a stream of air bubbles in contact with the reactants. Air flow has been varied from about 1 to about 100 cubic centimeters per minute in batches employing 500 grams of monomers, with the preferred air flow for this batch size being within the range of from about 15 to about 35 cubic centimeters per minute. With larger batch sizes, a lower rate of air flow can be used, e.g., 1 cubic foot per hour for batches of from 100 to 150 pounds.

In general, the polymerization reaction can be carried out at a temperature ranging from about 50 to about 130 degrees centigrade. The preferred temperature range is from about 80 to about 110 degrees centigrade. Normally, the reaction will be carried out at atmospheric pressure, although subatmospheric and superatmospheric pressures can be employed if desired or required.

Without intending to limit it in any manner, the present invention will be more fully described by the following examples which illustrate certain preferred embodiments of the invention. Unless otherwise indicated, all percentages and parts are by weight.

Example 1

A suitable reaction flask was equipped with a stirrer, condenser, thermometer, and means for introducing air into the reaction mixture or solution. The flask was charged with 46.8 parts of vinylnorbornene, 39.2 parts of maleic anhydride, and 5.3 parts of n-butyl mercaptan. The reactants were stirred and heated at 90 degrees centigrade for 4.5 hours while passing air through the reaction solution at an approximate rate of 20 cc. per minute. During this time, three 10-ml. portions of methyl isobutyl ketone were added at approximately 1.5-hour intervals to control viscosity. An additional 5.3 parts of n-butyl mercaptan was added (for a total of 11.3 parts per hundred parts of monomers) and heating continued for an additional 9.5 hours with the continued introduction of air. With continued heating, the air flow was stopped and vacuum applied to the reaction flask in order to remove the solvent and other volatiles. The product obtained was a low-melting brown solid, melting point 88–92 degrees centigrade; the yield was 81 parts (84 percent). Infrared analysis of the product showed the presence of both anhydride functionality and unsaturation. The product consisted of 95.5 weight percent nonvolatiles, contained $1 \times 10^{-6}$ equivalents of free mercaptan per gram and 3.6 percent sulfur, and had an anhydride equivalent weight of 231. In this example, the molar ratio of vinylnorbornene to maleic anhydride was 1:1.

Example 2

The procedure of Example 1 was repeated, except that the amounts of vinylnorbornene, maleic anhydride, and n-butyl mercaptan employed were 24 parts, 9.8 parts, and 3.9 parts, respectively, and 25 ml. of methyl isobutyl ketone were added after about 2.5 hours in place of periodically adding three 10-ml. portions. Total reaction time was about 18 hours. The resultant product consisted of 28.5 parts of solid, melting at about 90 degrees centigrade (76 percent yield). The product contained 91 percent solids. In this example, the molar ratio of vinylnorbornene to maleic anhydride was 2:1 and the initiator level was 11.3 parts per 100 parts of monomers.

Example 3

The procedure of Example 2 was repeated, except that the amounts of vinylnorbornene, maleic anhydride, and n-butyl mercaptan employed were 12 parts, 19.6 parts, and 3.6 parts, respectively. Total reaction time was about 24 hours. Obtained were 34 parts of product (97 percent yield) melting broadly at about 130 degrees centigrade. In this example, the molar ratio of vinylnorbornene to maleic anhydride was 1:2 and the initiator level was 11.3 parts per 100 parts of monomers.

Example 4

A mixture of 11.5 parts of the unsaturated polyanhydride obtained in Example 1 and 9 parts of a novolac epoxy resin having a viscosity at 125 degrees Fahrenheit of 30,000–90,000 cps. and a weight per epoxide of 175–185 was heated in an aluminum pan to give a homogeneous solution. The resultant solution was cured for 2 hours at 160 degrees Fahrenheit, followed by 6 hours at 350 degrees Fahrenheit. The resultant cured casting was divided into quarters which were post-cured at 500 degrees Fahrenheit for varying periods of time; one quarter was not post-cured as a control. Each sample then was crushed and submitted to thermogravimetric analysis (TGA), with the temperature at which 5 percent weight loss occurred being recorded. The results are summarized in Table I.

TABLE I

| Post-cure hours at 500° F.: | TGA Data, ° C.[1] |
| --- | --- |
| 0 | 342 |
| 3 | 388 |
| 8 | 385 |
| 24 | 393 |

[1] Temp. at which 5% weight loss occurred.

Post-curing at 500 degrees Fahrenheit clearly resulted in increased thermal stability.

Example 5

A second casting was prepared by dissolving in 18 parts of methyl isobutyl ketone 9 parts each of the polyanhydride and the novolac epoxy resin employed in Example 4, removing the solvent under reduced pressure, and curing first overnight at 180 degrees Fahrenheit and then for 6 hours at 350 degrees Fahrenheit. The resultant cured casting was analyzed by TGA as described in Example 4. The results are summarized in Table II.

TABLE II

| Post-cure hours at 500° F.: | TGA Data, °C.[1] |
|---|---|
| 0 | 362 |
| 3 | 360 |
| 8 | 385 |
| 24 | 390 |

[1] Temp. at which 5% weight loss occurred.

Again, post-curing at 500 degrees Fahrenheit clearly increased thermal stability.

It should be noted that in Examples 4 and 5 no accelerator was employed. Because of the excellent reactivity of the unsaturated polyanhydrides of the present invention toward epoxy resins, the use of an accelerator is not required. In fact, the use of an accelerator, such as 2-ethyl-4-methylimidazole, causes an excessive exotherm, in the absence of a solvent, which results in foaming of the curing mixture.

Example 6

A solution of unsaturated polyanhydride and novolac epoxy resin in methyl isobutyl ketone was prepared as described in Example 5. Three-mil wet films then were drawn down on tin panels and cured at various temperatures for various periods of time. The following properties were determined for each film: physical appearance (color), pencil hardness, methyl ethyl ketone rubs, and 180 degree bend. The presence of discoloration is indicative of degradation. Pencil hardness is a well-known measure of film hardness. The methyl ethyl ketone rub test measures the resistance of the film to solvent; the greater the number of rubs, the more solvent resistant the film. Finally, the 180 degree bend test measures in a qualitative way film flexibility. The data obtained are summarized in Table III.

TABLE III

| Cure schedule | | | Pencil hardness | MEK rubs | 180° bend |
|---|---|---|---|---|---|
| Temp., °F. | Time, min. | State | | | |
| 300 | 5 | Clear | 2H | 30 | Slight cracking. |
| 300 | 10 | do | 2H | 40 | Do. |
| 300 | 15 | do | 3H | >250 | Do. |
| 300 | 60 | do | 3H | >250 | Do. |
| 350 | 5 | do | 4H | 230 | Do. |
| 350 | 10 | do | 4H | >250 | Do. |
| 350 | 60 | do | 4H | >250 | Do. |
| 400 | 5 | do | 5H | >250 | Do. |
| 400 | 10 | do | 5H | >250 | Do. |
| 400 | 15 | do | 6H | >250 | Do. |
| 400 | 60 | do | 6H | >250 | Do. |
| 450 | 5 | Slightly yellow | 6H | >250 | Do. |
| 450 | 30 | do | 6H | >250 | Considerable cracking. |
| 450 | 60 | do | 7H | >250 | Do. |

TABLE IV

| Cure schedule | | | Pencil hardness | MEK rubs | 180° bend |
|---|---|---|---|---|---|
| Temp., °F. | Time, min. | State | | | |
| 300 | 5 | Clear | 2H | 200 | Considerable cracking. |
| 300 | 10 | do | 3H | >250 | Do. |
| 300 | 30 | do | 3H | >250 | Do. |
| 350 | 5 | do | 4H | >250 | Do. |
| 350 | 25 | do | 5H | >250 | Do. |
| 400 | 10 | do | 5H | >250 | Do. |
| 400 | 15 | do | 6H | >250 | Do. |
| 450 | 5 | Slightly yellow | 6H | >250 | Do. |
| 450 | 15 | do | 7H | >250 | Do. |

Example 7

The procedure of Example 6 was repeated, except that 0.05 part of 2-ethyl-4-methylimidazol was added as an accelerator. The data obtained are summarized in Table IV.

Example 8

The procedure of Example 5 was repeated, except that the novolac epoxy resin was replaced with an equal amount of a glycidyl polyether of 2,2'-bis(4-hydroxyphenyl)propane having a viscosity at 25 degrees centigrade of 10,000–16,000 cps. and a weight per epoxide of 180–200, and the amount of methyl isobutyl ketone was reduced to 9 parts. Similar results were obtained, except that the resultant casting was more flexible and less hard.

It is to be understood that the foregoing detailed description is given merely by way of illustration and that many variations may be made therein without departing from the spirit of the invention.

Having thus disclosed the invention, what is claimed is:

1. An unsaturated polyanhydride composition, suitable for use as an epoxy resin curing agent, which is represented by the following general formula:

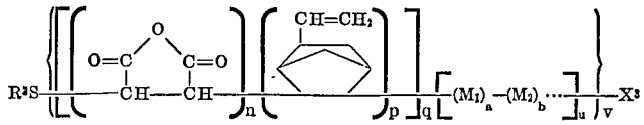

wherein
(a) $R^3$ is an organic radical derived from an initiator containing at least one mercapto group, said radical having from 1 to about 15 carbon atoms and being aliphatic, alicyclic, aromatic, or saturated heterocyclic, and unsubstituted or substituted, provided that hydroxyl groups and nitrogen are not present, (b) $X^3$ is either hydrogen or $R^3S-$, (c) $M_1$, $M_2$, . . . are monomers, other than 5-vinyl-2-norbornene and maleic anhydride, which constitute no more than about 50 weight percent of said composition exclusive of initiator and are selected from the group consisting of vinyl aromatic compounds; vinyl cyanides; alkyl esters of acrylic, methacrylic, and crotonic acids wherein the alkyl group contains from 1 to about 18 carbon atoms; and amides of acrylic, methacrylic, and crotonic acids, (d) $a$, $b$, . . . and $u$ independently are integers, including zero.

(e) $n$, $p$, and $q$ independently are integers equal to or greater than 1, and (f) $v$ is an integer greater than 1 and less than about 10.

2. The composition of claim 1 wherein the molar ratio of 5-vinyl-2-norbornene to maleic anhydride is in the range of from about 2:1 to about 1:2.

3. The composition of claim 1 wherein said organic radical is selected from the group consisting of aliphatic and alicyclic radicals, has from 2 to about 12 carbon atoms, and is either unsubstituted or substituted only with alkyl, cycloalkyl, alkoxy, cycloalkoxy, carboxy, alkoxycarbonyl, and/or cycloalkoxycarbonyl groups.

4. The composition of claim 1 wherein $q$ is 1 and $a$, $b$, ... and $u$ are zero.

5. The composition of claim 4 wherein the molar ratio of 5-vinyl-2-norbornene to maleic anhydride is in the range of from about 2:1 to about 1:2.

6. The composition of claim 4 wherein said organic radical is selected from the group consisting of aliphatic and alicyclic radicals, has from 2 to about 12 carbon atoms, and is either unsubstituted or substituted only with alkyl, cycloalkyl, alkoxy, cycloalkoxy, carboxy, alkoxycarbonyl, and/or cycloalkoxycarbonyl groups.

7. The composition of claim 4 wherein $n$ and $p$ are 1.

8. The composition of claim 7 wherein said organic radical is selected from the group consisting of aliphatic and alicyclic radicals, has from 2 to about 12 carbon atoms, and is either unsubstituted or substituted only with alkyl, cycloalkyl, alkoxy, cycloalkoxy, carboxy, alkoxycarbonyl, and/or cycloalkoxycarbonyl groups.

9. The composition of claim 7 wherein said organic radical is aliphatic, unsubstituted, and contains from 2 to about 8 carbon atoms.

10. A process for preparing an unsaturated polyanhydride composition which comprises the steps of:
    (a) mixing 5-vinyl-2-norbornene, maleic anhydride, and from 0 to about 50 weight percent, based on total monomers, of at least one monomer selected from the group consisting of vinyl aromatic compounds; vinyl cyanides; alkyl esters of acrylic, methacrylic, and crotonic acids wherein the alkyl group contains from 1 to about 18 carbon atoms; and amides of acrylic, methacrylic, and crotonic acids,
    (b) adding an initiator containing at least one mercapto group, which initiator has from 1 to about 15 carbon atoms and is aliphatic, alicyclic, aromatic, or saturated heterocyclic, and unsubstituted or substituded, provided that hydroxyl groups and nitrogen are not present,
    (c) introducing air into the reaction mixture or solution, and
    (d) polymerizing the monomers at a temperature of from about 50 to about 130 degrees centigrade for a time sufficient to give essentially complete conversion.

11. The process of claim 10 wherein the molar ratio of 5-vinyl-2-norbornene to maleic anhydride is in the range of from about 2:1 to 1:2.

12. The process of claim 10 wherein said initiator is present in an amount varying from 0.01 to about 0.30 equivalent of mercaptan per mole of monomers.

13. The process of claim 10 wherein said initiator has from 2 to about 12 carbon atoms, is either aliphatic or alciyclic, and is either unsubstituted or substitued only with alkyl, cycloalkyl, alkoxy, cycloalkoxy, carboxy, alkoxycarbonyl, and/or cycloalkoxycarbonyl groups.

14. The process of claim 10 wherein the monomers employed consist of 5-vinyl-2-norbornene and maleic anhydride.

15. The process of claim 14 wherein the molar ratio of 5-vinyl-2-norbornene to maleic anhydride is in the range of from about 2:1 to about 1:2.

16. The process of claim 14 wherein said initiator is present in an amount varying from 0.01 to about 0.30 equivalent or mercaptan per mols of monomers.

17. The process of claim 14 wherein the molar ratio of 5-vinyl-2-norbornene to maleic anhydride is 1:1.

18. The process of claim 17 wherein said initiator is present in an amount varying from 0.01 to about 0.30 equivalent of mercaptan per mols of monomers.

19. The process of claim 17 wherein said initiator is aliphatic, unsubstituted, and contains from 2 to about 8 carbon atoms.

20. The process of claim 19 wherein said initiator is n-butylmercaptan.

21. The process of claim 10 wherein the polymerization temperature is in the range of from about 80 to about 110 degrees centigrade.

References Cited

UNITED STATES PATENTS

| | | | |
|---|---|---|---|
| 3,280,080 | 10/1966 | Potter et al. | 260—78.5 |
| 3,494,897 | 2/1970 | Reding et al. | 260—78.5 |
| 3,143,533 | 8/1964 | Pledger | 260—78.5 |

JAMES A. SEIDLECK, Primary Examiner

J. KIGHT III, Assistant Examiner

U.S. Cl. X.R.

260—836